United States Patent [19]
Shekleton et al.

[11] Patent Number: 5,095,694
[45] Date of Patent: Mar. 17, 1992

[54] FUEL PURGING SYSTEM FOR A TURBINE ENGINE

[75] Inventors: Jack R. Shekleton; Roy K. Johanson, both of San Diego, Calif.

[73] Assignee: Sundstrand Corporation, Rockford, Ill.

[21] Appl. No.: 156,219

[22] Filed: Feb. 16, 1988

[51] Int. Cl.[5] .................................... F02G 1/00
[52] U.S. Cl. .................................... 60/39.094; 60/741
[58] Field of Search .................. 60/741, 39.141, 39.06, 60/39.825, 39.094

[56] References Cited

U.S. PATENT DOCUMENTS

| | | |
|---|---|---|
| 2,814,180 | 11/1957 | Hession . |
| 2,846,845 | 8/1958 | Parker ............................. 60/39.094 |
| 3,344,602 | 10/1967 | Davies et al. ................... 60/39.141 |
| 3,426,527 | 2/1969 | O'Connor . |
| 3,556,444 | 1/1971 | Kopp ............................... 60/39.094 |
| 3,841,089 | 10/1974 | Clark . |
| 3,901,025 | 8/1975 | Bryerton et al. . |
| 4,041,695 | 8/1977 | Harper et al. .................... 60/39.094 |
| 4,215,549 | 8/1980 | Daeschner . |
| 4,423,595 | 1/1984 | McLean ............................. 60/39.094 |
| 4,539,809 | 9/1985 | Stanley et al. . |

FOREIGN PATENT DOCUMENTS 60-164627 8/1985 Japan .

Primary Examiner—Richard A. Bertsch
Assistant Examiner—T. Thorpe
Attorney, Agent, or Firm—Wood, Phillips, Mason, Recktenwald & VanSanten

[57] ABSTRACT

A purge system for the fuel injection system of a turbine engine is simplified by utilizing a system including first and second three-way valves 42, 44, each having an inlet port 46, an outlet port 48, and an inlet-outlet port 50 together with a movable valve element 52 which can alternately connect the inlet-outlet port 50 to the associated inlet port 46 or associated outlet port 48. A purge line 66 is connected to the outlet port 48 of each of the valves 42, 44 and extends into an exhaust conduit 20 of a turbine engine. A first line 60 is connected to the inlet-outlet port 50 of a first of the valves 42 and is connected to a start injector 30. A second line 63 is connected to the inlet-outlet port 50 of the other valve 48 and is adapted to be connected to at least one main injector 26. Separate conduits 62, 64 connected to respective ones of the inlet ports 46 are connected to respective controlled sources 36, 38, 40 of fuel under pressure.

4 Claims, 1 Drawing Sheet

FUEL PURGING SYSTEM FOR A TURBINE ENGINE

FIELD OF THE INVENTION

This invention relates to turbine engines, and more particularly, to a purging system for the fuel injection system of a turbine engine.

BACKGROUND OF THE INVENTION

Turbine engines include one or more combustors, each provided with one or more main fuel injectors for injecting fuel during normal operation of the engine and one or more start injectors which inject fuel while the engine is being started. These injectors include nozzles or outlets that are disposed within the combustion space of the combustor and which may include very small orifices in order to obtain a desired atomization of fuel upon injection.

Inasmuch as the orifices or outlets are within the combustor, they are exposed to substantial heat. During normal operation, this does not present a problem because the flow of fuel to the injector provides a cooling action and the propagation of combustion along with the flow of oxidant will prevent undesirable overheating of the injectors.

When operation of the turbine is terminated, fuel no longer flows through the fuel injector to cool the same. Similarly, oxidant is no longer passed into the combustor and the cooling action of the oxidant is no longer available. Consequently, residual heat in the combustor area of the engine will cause elevation of the temperature of the fuel injectors. In terms of the material of which the injectors are formed, this raising in temperature upon cessation of operation of the turbine does not present a problem. However, the presence of residual fuel in the injector at such time will frequently cause a so-called coking problem. Being carbonaceous in nature, such fuel, upon being heated, will begin to undergo a destructive distillation reaction and a coke-like or and/or tarry residue will remain. This residue will clog the injectors and result in improper operation on subsequent start-ups.

Consequently, the injection system of turbine engines has been purged of fuels following shut-down to prevent coking from occurring and thus prevent clogging. In some cases, the purged fuel is dumped overboard. See, for example, U.S. Pat. No. 2,846,845 and 3,426,527. In other cases, the fuel being purged is collected in a tank or the like. See U.S. Pat. No. 3,841,089 and 3,901,025.

While both approaches serve the purpose, the former is undesirable in that it requires a certain amount of plumbing to convey the fuel to be purged to an overboard point of discharge. The latter is undesirable because it will require some sort of a purge bottle which may be bulky and of substantial weight, factors that are particularly disadvantageous in aircraft turbine installations.

The present invention is directed to overcoming one or more of the above problems.

SUMMARY OF THE INVENTION

It is the principal of the invention to provide a new and improved purge system for use with turbine engines. It is also an object of the invention to provide a turbine engine including the new and improved purge system.

An exemplary embodiment of the invention achieves the first mentioned object in a system intended for purging the fuel injection system of a turbine engine having a combustor including at least one start injector and one main injector along with a turbine wheel adapted to receive gases of combustion from the combustor so as to be driven thereby and an exhaust conduit in fluid communication with the turbine wheel to conduct spent gases of combustion therefrom. The purge system includes first and second three-way valves each having an inlet port, an outlet port and an inlet-outlet port. Each valve also includes a valve means for alternately connecting the inlet-outlet port to the associated inlet port or the associated outlet port. A purge line is provided and is connected to the outlet port of each of the valves and is adapted to extend into an exhaust conduit of the turbine engine. A first line is connected to the inlet-outlet port of a first of the valves and is adapted to be connected to a start injector. A second line is connected to the inlet-outlet port of a second of the valves and is adapted to be connected to at least one main injector. Separate conduits are connected to respective ones of the inlet ports and are adapted to be connected to respective controlled sources of fuel under pressure.

As a result of the foregoing construction, purged fuel is directed into the engine exhaust conduit eliminating any need for plumbing extending to an overboard location for dumping fuel. It also eliminates any need for a reservoir or tank for the purged fuel.

In a highly preferred embodiment, a check valve is located in the purge line and is disposed to allow fluid flow therein only toward the exhaust conduit. In the highly preferred embodiment, the check valve has a crack value of several pounds per square inch and thus is operable to prevent purging of the fuel into the exhaust on a so-called "hung start".

The invention also contemplates the provision of flow limiting means in the purge line for limiting fuel flow therein to a value sufficiently low as to prevent the occurrence of an explosive or combustible fuel-oxidant mixture in the exhaust conduit. For simplicity, the flow limiting means preferably is in the form of an orifice.

In a highly preferred embodiment, the purge line is a single conduit having parallel connections to the outlet ports of the valves.

In a highly preferred embodiment, first and second lines are constructed and arranged to have a minimum volume to minimize the quantity of fuel that requires purging.

In a highly preferred embodiment, the valve means of each valve normally connects the inlet-outlet port to the outlet port.

The purge system is ideally suited to be in combination with a turbine engine including a combustor, a turbine wheel and an exhaust conduit as alluded to previously. In such a combination, the purge line is connected to terminate in the exhaust conduit while the first and second lines are connected to the respective start and main injectors. A controlled means for providing fuel delivery under pressure to the start injector and to at least one main injector is also provided.

Other objects and advantages will become apparent from the following specification taken in connection with the accompanying drawings.

DESCRIPTION OF THE PREFERRED EMBODIMENT

Figure 1:
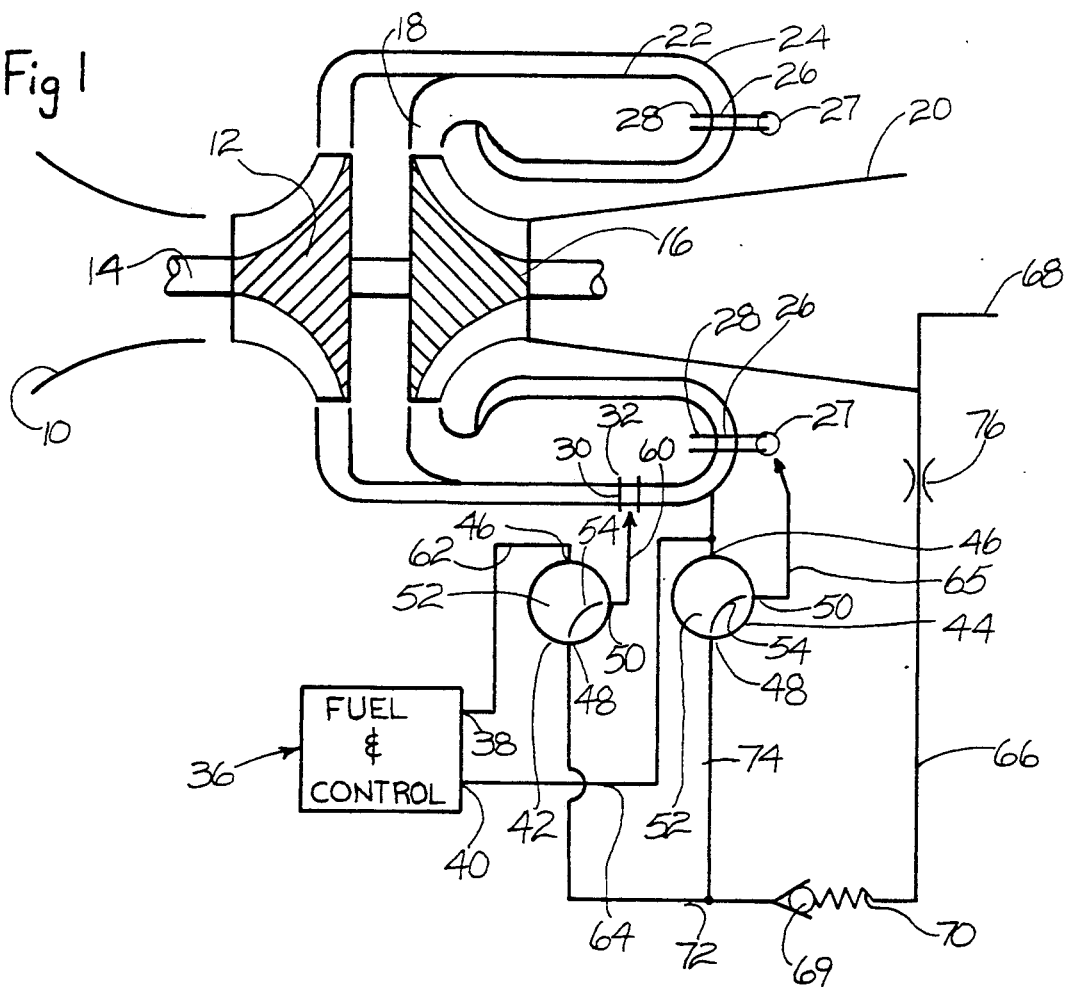
FIG. 1 is a somewhat schematic view of a turbine engine embodying a purge system made according to the invention.

An exemplary embodiment of a turbine including a purge system made according to the invention is illustrated in the drawings and is seen to include an air inlet 10 extending to a rotary compressor 12 mounted for rotation with a shaft 14. The shaft 14 also mounts a turbine wheel 16.

Hot gases of combustion are applied by a nozzle 18 to the turbine wheel 16 to drive the same as well as the shaft 14 and thus power the rotary compressor 12. An exhaust conduit 20 extends from the turbine wheel 16 and receives spent gases therefrom and conveys them to a desired point of discharge, assuming that power is taken from the turbine off of the shaft 14. In some cases, the conduit 20 may in fact be an exhaust nozzle in the situation where the gases of combustion are utilized to provide thrust, the turbine wheel 16 absorbing only so much power therefrom as is required to drive the compressor 12.

Hot gases of combustion for the nozzle 18 are generated in one or more combustors 22. In the embodiment illustrated, a so-called annular combustor 22 is utilized meaning that only a single combustor is present. However, a plurality of can-like combustors could likewise be used and the invention is intended to extend to such use. The annular combustor 22 is disposed about the rotational axis of the shaft 14 and itself is surrounded by a compressed air manifold 24. The manifold 24 receives compressed air from the rotary compressor 12 and brings it about approximately three sides of the annular combustor 22 to cool the walls of the same. Various openings (not shown) are located in the walls of the combustor 22 to admit compressed air to the interior of the combustor 22 to provide an oxidant for fuel which is burned therein.

The engine includes a plurality of main fuel injectors 26, frequently connected in parallel to each other by a manifold 27. Each main injector 26 includes an end 28 opening to the interior of the annular combustor 22 for delivery of fuel to the interior of the combustor.

In addition, one or more start fuel injectors 30 have ends 32 within the interior of the combustor 22.

The main injectors 26 are utilized during normal operation of the engine and during later stages of a start-up operation. The start injector 30 is utilized in the early stages of a start-up operation but is not utilized at all during normal operation.

Not untypically, a starting motor (not shown) drives the shaft 14 for starting purposes. At 10% of rated speed, the start injector or injectors 30 are brought into operation. Generally speaking, in less than a second, ignition of the fuel within the combustor 22 will occur. However, through conventional detectors, a greater amount of time is allowed. If ignition is not detected by a suitable probe within about three seconds, the start is aborted. Conversely, if ignition is detected, and the burning fuel and/or starter motor have accelerated the shaft 14 up to about 15% of its rated speed, the main injectors 26 will be brought into operation. Shortly thereafter, the start injectors will be turned off. This mode of operation is by and large conventional and is accomplished by conventional means shown generally as a "fuel and control" source 36. The fuel and control source 36 includes one port 38 through which fuel under pressure is adapted to be delivered to the start injector 30 and a second port 40 through which fuel under pressure is adapted to be directed to the manifold 27 for ultimate injection through the ends 28 of the main injectors 26. Two separate ports 38 and 40 are required because the injectors 26 and 30 must operate at different times and at different fuel flow rates.

According to the invention, there are provided two three-way valves 42 and 44 adapted for respective association with the start injector 30 and the main fuel injectors 26. The valves 42 and 44 are solenoid operated and their control is conventional and managed by the fuel and control source 36.

Each of the valves 42 and 44 includes an inlet port 46, an outlet port 48 and an inlet-outlet port 50. Also included is a movable valve member 52 whose position is determined by the solenoid operator (not shown) or the like. The valve member 52 includes an internal conduit 54. When the solenoid operator is de-energized, the conduit 54 of each valve is in the position illustrated in the Figure connecting the outlet 48 with the inlet-outlet 50. Conversely, when the solenoid actuator is actuated, the internal conduit 54 will interconnect the inlet 46 and the inlet-outlet 50 of the associated valve 42 or 44. In other words, the valves 42 and 44 have a normal condition wherein the inlet-outlet 50 is connected to the outlet port 48.

The inlet-outlet 50 of the valve 42 is connected via a fuel line 60 to the start injector 30. Thus, when the solenoid for the valve 42 is energized and the fuel in control 36 so dictates, fuel under pressure may be delivered from the port 38 via a conduit 62 to the start injector 30. Similarly, when the solenoid for the valve 44 is energized, and the fuel in control 36 so dictates, fuel under pressure may be delivered from the port 40 via a line 64, the valve 4, and a line 65 which connects to the manifold 27, and thus to the main injectors 26.

The system also includes a purge line 66 which includes an end 68 opening into the exhaust conduit 20 for the discharge of purged fuel therein. In the line 66 is a check valve 69 which is held in a normally closed condition by a spring 70. The check valve 69 is disposed so as to prevent the flow of fluid in the line 66 from the end 68. Stated another way, the check valve 69 only allows fluid flow within the line 66 toward the end 68. Upstream of the check valve 69, the line 66 includes parallel connections 72 and 4 to the outlet ports 48 respectively of the valves 42 and 4. The system is generally completed by a flow limiting means in the line 66, preferably in the form of an orifice 76.

In start-up or normal operation, one of both of the valves 42 and 44 will be energized in the manner identified previously and operation of the turbine and the fuel injection specifically will be under the influence of the fuel and control source 36. In the event of turbine shutdown, the valves 42 and 44 will have their respective solenoids de-energized and will assume the condition illustrated in the Figure. At this time, if the shaft 14 is not rotating at at least 10% of its rated speed, there will be no need to purge the injectors 26 or 30 since they will not have been brought into operation. Conversely, if the shaft 14 is operating at at least 10% of its rated speed, the rotary compressor 12 will be providing some compressed air which will be delivered, under pressure, to the interior of the combustor 22 via the normal path. Thus, the higher pressure resulting from the delivery of such compressed air at the interior of the combustor 22 will act against fuel within the injectors 26 and 30 and cause reverse flow through the respective lines 60 and 65, through respective valves 42 and 44, the check valve 69 and to the line 66 to be discharged at the end 68 within the exhaust conduit 20. Thus, fuel is purged from the injectors. In this regard, it is preferable that the lines 60 and 65 along with the manifold 27 be made of minimal volume so as to minimize the amount of fuel exiting the purge line at the end 68. This can be accomplished by locating the valves 42 and 44 as close as possible to the start injector 30 and the manifold 27 respectively to minimize the length of the lines 60 and 65. Additionally, the internal diameter of the lines 60 and 65 should be made as small as possible and yet allow an adequate amount of fuel to pass therethrough under the pressure constraints of the system.

The check valve 69 is optional in the system and is generally provided so as to prevent purging of the system in the event of a so-called "hung start". A hung start is a case where ignition is obtained within the combustor 22 but for some reason, there is no acceleration of the turbine wheel 16. If during a hung start, fuel is discharged into the exhaust conduit 20, because of the low flow rates of gas that occur during a hung start, should such fuel ignite, the resulting combustion will continue to occur within the conduit, an undesirable occurrence. The check valve 69, along with its spring 70, acts to prevent purging in the case of a hung start. In such a case, because the shaft 14 will be turning at a relatively low percentage of its rated speed, the pressure of the gas being compressed by the rotary compressor 12 will be relatively low. The spring 70 can be selected so as to prevent the check valve 60 from opening at such low pressures which, in turn, means that there can be no discharge of purged fuel at the end 68. Preferably, the value at which the spring 70 allows the check valve 69 to open (sometimes known as the "crack value") is in the range of 5-10 psi. It should also be noted that even though the check valve 69 prevents purging in this instance, there will be no problem with coking because at this stage of a starting operation, the engine itself has not been operated for a sufficient period of time to get so hot as to raise the possibility of coking. Thus, by suitably selecting the value of the spring 70, it can be assured that the check valve 69 will open only when the combustor internal pressure is at or above a desired level which in turn is representative of desired high flows which are sufficient to avoid any questions of propriety of purging fuel through the end 68 into the exhaust conduit 20.

In this regard, the provision of the flow limiting means in the form of the orifice 76 is also optional but desirable. The same may act to assure that the rate of fuel flow through the purge line 66, that is, the purge rate, is sufficiently low that, in connection with the flow of gas through the exhaust conduit 20, the existence of a combustible or explosive fuel-oxidant mixture therein will not result. If the flow rate is maintained sufficiently low by reason of the provision of the orifice 76, pressurized gas resulting from rotation of the rotary compressor 12 as the same winds down will move sufficient air through the exhaust conduit 20 as to evaporate the discharged fuel so the resulting mixture is sufficiently starved of fuel that it cannot be combusted or exploded.

Figure 2:
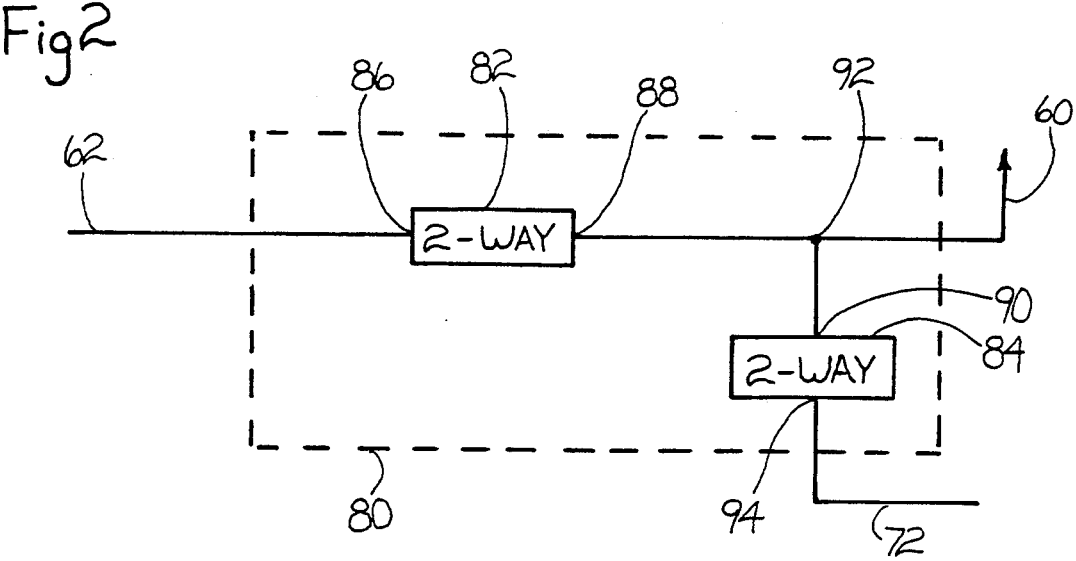
FIG. 2 is a fragmentary schematic of a alternative valve system that may be used in practicing the invention.

In some cases, it may be desirable to utilize three-way valves made up of two way valves in lieu of the three way valves 42 and 44. One such alternative valve is shown at 80 in FIG. 2 as being intended to replace the valve 42. However, the same construction could also be used as a replacement for the valve 44.

The valve 80 includes two solenoid operated, two way valves 82 and 84 connected to each other and to the lines or conduits 60, 62, 72 as illustrated. A port 86 to the valve 82 thus serves as the inlet port for ultimate connection to the fuel and control source 36. Ports 88 and 90 of the valves 82 and 84 are connected together at a junction 92 which then serves as the inlet-outlet port and is connected to the injector 30. Finally a port 94 of the valve 84 serves as the outlet port for the valve 80 and is appropriately connected to the purge line.

In operation, the valve 82 is opened and the valve 84 closed when fuel is to be supplied to the engine. When purging is desired, those conditions are reversed. Preferably the valve 82 is normally closed while the valve 84 is normally open and an electrical interlock is utilized in their actuating circuits to prevent both valves 82 and 84 from simultaneously opening.

From the foregoing, it will be appreciated that a purge system made according to the invention is simple and constructed requiring a minimum number of control valves and eliminates any need for overflow lines to an overflow point of discharge as well as any reservoir for purged fuel. Thus, the same is reliable and inexpensive.

We claim:

1. A purge system for the fuel injection system of a turbine engine having a combustor including at least one start injector and one main injector, a turbine wheel adapted to receive gases of combustion from said combustor to be driven thereby, and an exhaust conduit in fluid communication with said turbine wheel to conduct spent gases of combustion therefrom, said purge system comprising:

first and second three-way valves, each having an inlet port, and outlet port and an inlet-outlet port, and valve means for alternately connecting the inlet-outlet port to the associated inlet port or associated outlet port;

a purge line connected to said outlet port of each of said valves and adapted to extend into an exhaust conduit;

a first line connected to the inlet-outlet port of a first of said valves and adapted to be connected to a start injector;

a second line connected to the inlet-outlet port of a second of said valves and adapted to be connected to at least one main injector;

separate conduits connected to respective ones of said inlet ports and adapted to be connected to respective controlled sources of fuel under pressure; and a check valve in said purge line disposed to allow fluid flow therein only toward the exhaust conduit.

2. The purge system of claim 1 wherein said check valve has a crack value of several psi.

3. A purge system for the fuel injection system of a turbine engine having a combustor including at least one start injector and one main injector, a turbine wheel adapted to receive gases of combustion from said combustor to be driven thereby, and an exhaust conduit in fluid communication with said turbine wheel to conduct spent gases of combustion therefrom, said purge system comprising:

first and second three-way valves, each having an inlet port, an outlet port and in inlet-outlet port, and valve means for alternately connecting the inlet-outlet port to the associated inlet port or associated outlet port;

a purge line connected to said outlet port of each of said valves and adapted to extend into an exhaust conduit;

a first line connected to the inlet-outlet port of a first of said valves and adapted to be connected to a start injector;

a second line connected to the inlet-outlet port of a second of said valves and adapted to be connected to at least one main injector;

separate conduits connected to respective ones of said inlet ports and adapted to be connected to respective controlled sources of fuel under pressure; and flow limiting means in said purge line for limiting fuel flow therein to a value sufficiently low as to prevent the occurrence of explosive or combustible fuel-oxidant mixtures in said exhaust conduit.

4. The purge system of claim 3 wherein said flow limiting means is an orifice.

* * * * *